United States Patent [19]

Tobey

[11] 4,167,028

[45] Sep. 4, 1979

[54] METHOD AND AN APPARATUS FOR TIME SIGNAL ENCODING/DECODING

[75] Inventor: Richard Tobey, Sunnyvale, Calif.

[73] Assignee: Recortec, Inc., Sunnyvale, Calif.

[21] Appl. No.: 896,096

[22] Filed: Apr. 13, 1978

[51] Int. Cl.² .......................... G11B 5/09; G11B 27/00
[52] U.S. Cl. ..................................... 360/72.2; 360/14; 360/49; 360/18
[58] Field of Search .................. 360/72, 51, 14, 13, 360/49, 40, 18, 19

[56] References Cited

U.S. PATENT DOCUMENTS

| 3,564,161 | 2/1971 | Takishima | 360/14 X |
|---|---|---|---|
| 3,736,565 | 5/1973 | Sidline | 360/72 |
| 3,739,086 | 6/1973 | Heather | 360/72 X |
| 3,851,116 | 11/1974 | Cannon | 360/72 |
| 3,852,811 | 12/1974 | Aghazadeh | 360/51 |

*Primary Examiner*—Bernard Konick
*Assistant Examiner*—Donald McElheny, Jr.
*Attorney, Agent, or Firm*—Thomas E. Schatzel

[57] ABSTRACT

A method and a video tape recorder apparatus having an encoder for serially pulse width modulating each of the normal frame-reference pulses with a bit of an elapsed record time signal and for recording the signal onto the frame-reference track of a video tape and a decoder for, during playback of the tape, extracting from the reproduced signal the frame-reference pulses and the elapsed record time signal and for generating therefrom a frame count signal.

16 Claims, 3 Drawing Figures

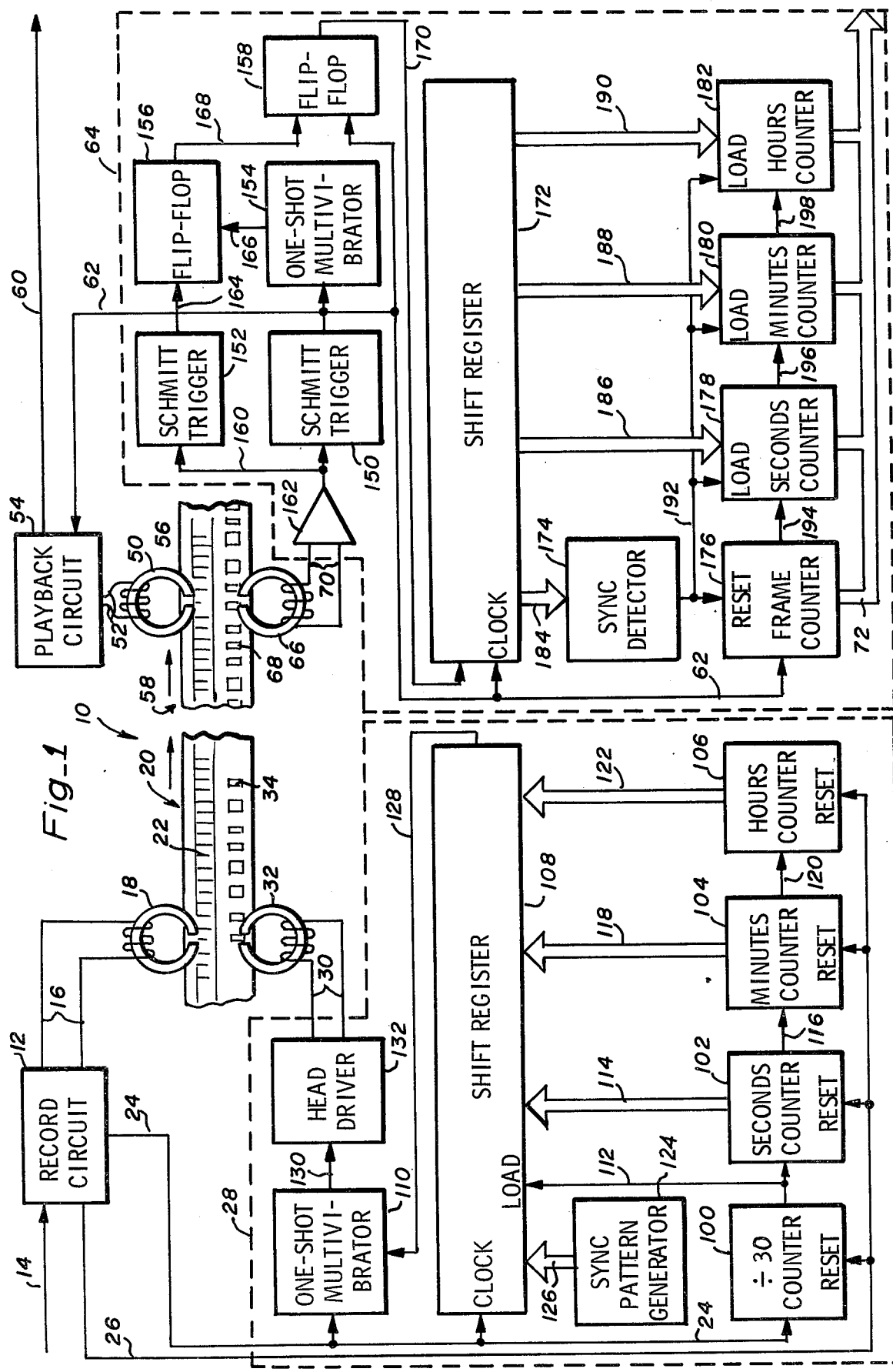

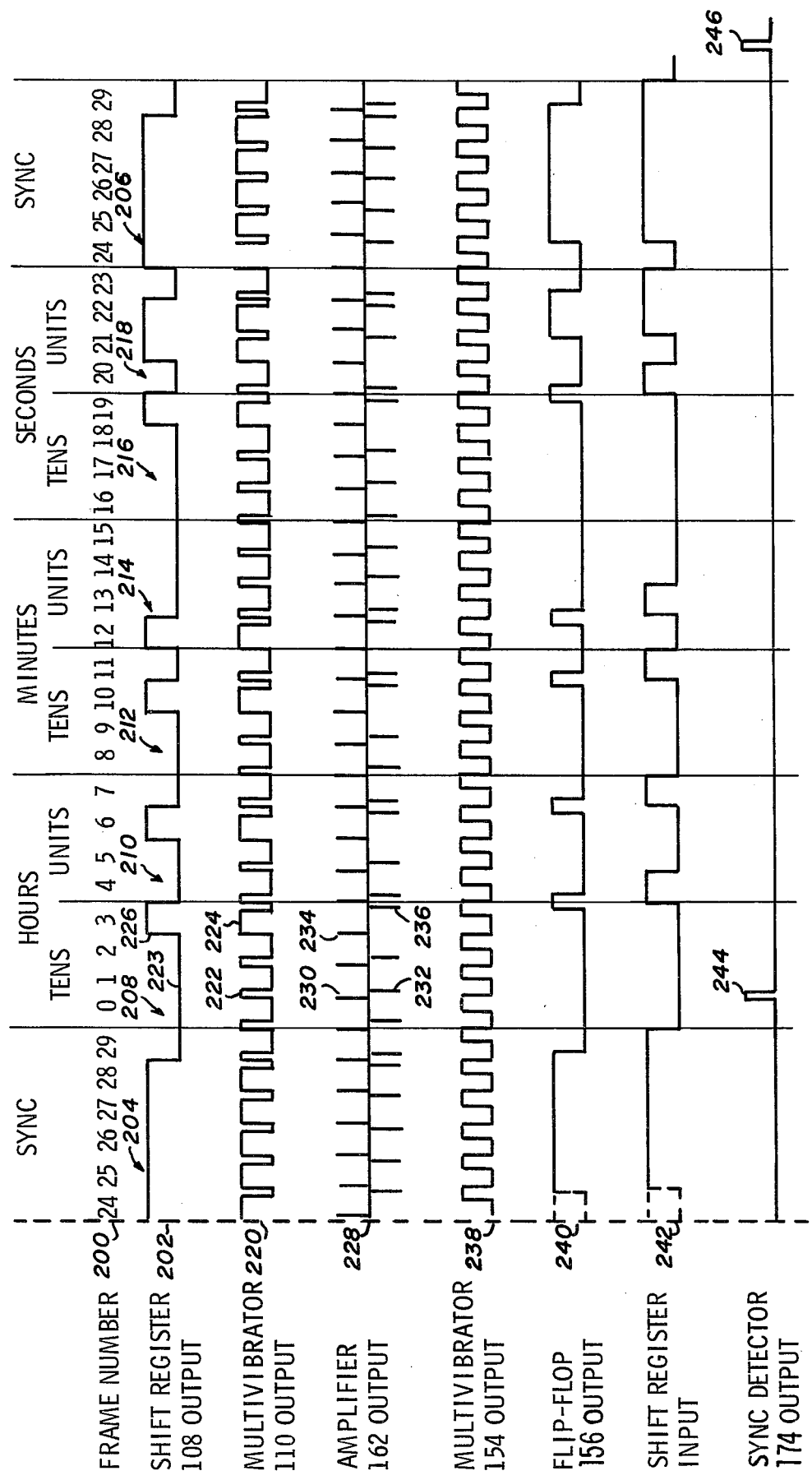
Fig_2

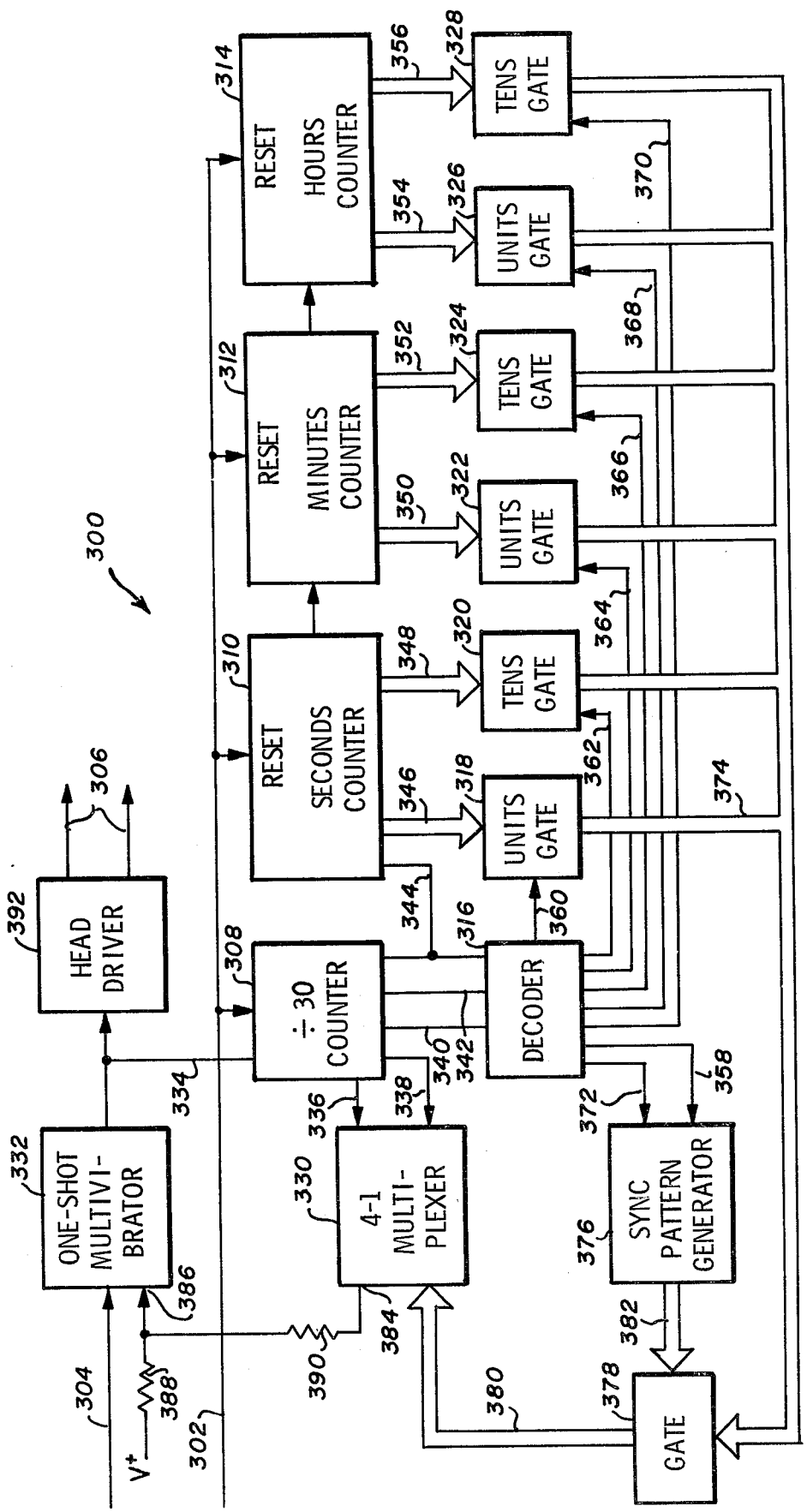
Fig_3

METHOD AND AN APPARATUS FOR TIME SIGNAL ENCODING/DECODING

BACKGROUND OF THE INVENTION

1. Field of the Invention

The present invention relates generally to video tape recorders and more particularly to time signal encoding/decoding apparatus therefor.

2. Description of the Prior Art

Heretofore, numerous encoding/decoding devices have been employed to record a time and/or control signal onto a dedicated track of a video tape. Such recording is highly advantageous as it permits the tapes so recorded to be processed by automatic tape handling equipment for such purposes as cuing the tape, locating scenes recorded on the tape, editing the tape and synchronizing two tapes.

A popular format for time signal recording is the 80-bit code, commonly referred to as the SMPTE edit code, which is recorded with each frame of the video signal. In this code, the 80 bits which are assigned to the time code include bits 0 through 3, and 8 and 9 for encoding the current frame number; and bits 16 through 19, and 24 through 26 for encoding the seconds; bits 32 through 35, and 40 through 42 for encoding the minutes; and bits 48 through 51, and 56 through 59 for encoding the hours of the time. Bits 64 through 79 are used for encoding a synchronizing word.

The 80 bits of the code are recorded onto a dedicated track of the tape once each frame; in other words, at a rate of 2400 bits per second, using the bi-phase technique (where a zero is represented by a single phase reversal and a one by two phase reversals per bit period).

The SMPTE code is disadvantageous in that it requires the use of a dedicated track of the tape which could otherwise be utilized for other purposes.

Furthermore, the code requires the use of relatively wide band circuitry to process 2400 bits per second. As a consequence, before the coded signal may be reliably reproduced, the tape must be brought up to speed. Also, the code is highly susceptable to dropouts which occur when the tape comes off the head.

Additionally, to generate and to record the code requires relatively complex, expensive and unreliable equipment.

SUMMARY OF THE PRESENT INVENTION

It is therefore an object of the present invention to provide a method and an apparatus for recording and reproducing a low band width time code signal from a video tape so as not to require the use of an additional dedicated tape track.

Briefly, the preferred embodiment of the apparatus comprises a tape recorder including an encoder for modulating each of the frame-reference pulses with a bit derived from a time signal and for recording the modulated signal onto a tape and a decoder for reproducing the frame-reference pulses and the time signal from the signal generated when the tape is played back and for developing therefrom a frame count signal.

The encoder has a frame counter, a seconds counter, a minutes counter, and an hours counter which count the frame-reference pulses and develop a relative elapsed record time signal therefrom, a shift register which is parallel loaded once each second with the time signal and a synchronizing word signal and which is shifted by each of the frame-reference pulses, and a one-shot multivibrator which is responsive to each bit signal that is serially shifted out of the shift register and which is operative to modulate a corresponding one of the frame-reference pulses therewith to develop a pulse width modulated pulse to be recorded onto the tape.

The decoder has a Schmitt trigger which is responsive to the flux reversal associated with the leading edge of each recorded modulated pulse and which is operative to generate a pulse of the reproduced frame-reference pulses, another Schmitt trigger which generates a pulse coincident with the flux reversal associated with the trailing edge of each recorded modulated pulse, two flip-flops and a one-shot multivibrator which develop a bit signal level dependent upon the spacing between the pulses generated by the Schmitt triggers, a shift register which serially receives the bit signals, a synchronization word detector which recognizes the bit signals in the shift register that form the synchronization word, and a seconds counter, a minutes counter and an hours counter which are loaded by parallel outputs of the shift register in response to the synchronization detector and clocked by each of the frame-reference pulses to develop a frame count signal and a reproduced time code signal.

The ability to encode and decode the frame-reference pulses with a low band width time code signal for recording onto the frame-reference track of a video tape is thus a material advantage of the present invention.

These and other objects and advantages of the present invention will no doubt become apparent to those of ordinary skill in the art after having read the following detailed description of the preferred embodiment illustrated in the several figures of the drawing.

IN THE DRAWING

FIG. 1 is a schematic diagram illustrating a preferred embodiment of a tape recorder having circuitry for time signal encoding/decoding in accordance with the present invention;

FIG. 2 is a timing diagram illustrating various signals associated with the tape recorder shown in FIG. 1; and FIG. 3 is an alternative embodiment of a time signal encoder for use in a tape recorder in accordance with the present invention.

DETAILED DESCRIPTION OF THE PREFERRED EMBODIMENT

A schematic diagram illustrating the electronic components 10 of a tape recorder apparatus having improved time signal encoding/decoding in accordance with the present invention is illustrated in FIG. 1. The recorder includes a record circuit 12 for receiving a video signal generated on line 14 and for driving a pair of lines 16 which are connected to a tape recording head 18. The record circuit and the head are of the type which are well known by those skilled in the art and which are suitable for processing video signals and developing therefrom time-varying magnetic fields for selectively magnetizing a track of a video tape, such as the portion of the video tape 20 which is illustrated at 22. The record circuit also generates, once each frame, a vertical or frame-reference, capstan synchronizing pulse on a line 24 and when recording is commenced, a record initiate pulse on a line 26.

Connected to lines 24 and 26, an encoder circuit 28 monitors the period of time which has elapsed since the occurrence of the record initiate pulse and generates a signal in the form of a stream of bits which is synchronized with the frame-reference pulses and which is indicative of this period. From the bit stream signal and the frame-reference pulses, the encoder circuit generates pulses between a pair of lines 30 which are connected to a tape recording head 32 suitably disposed to selectively magnetize a frame-reference track 34 of the tape. Each pulse generated between lines 30 has a leading edge which is time coincident with a frame-reference pulse developed by record circuit 12 on line 24 and a pulse width which is encoded by one bit of the bit stream signal. In other words, one pulse width (or pulse duration) modulated pulse is generated between lines 30 each frame.

The recorder further includes a playback head 50 connected by a pair of lines 52 to a playback circuit 54. The head and the playback circuit are of the prior art type for recovering from a time-varying magnetic field, such as produced by a suitably disposed and recorded track of a video tape such as those illustrated at 56 and 58, respectively, a reproduced video signal which is developed on line 60 and for synchronizing the tape head and capstan speed. For proper operation, the playback circuit further requires capstan synchronizing frame-reference pulses be developed on line 62.

The frame-reference pulses are reproduced by a decoder circuit 64 which, with suitably recorded tapes, further develops a time signal indicative of the relative time location of that portion of the tape which is currently being processed.

The decoder circuit utilizes a playback head 66 disposed in proximity to a frame-reference track 68 of tape 58 to generate a series of pulses between a pair of lines 70 for input to the decoder. For each recorded pulse, the head develops a pair of pulses, one coincident with each change in magnetization of the tape.

In response to the first of each pair of pulses the decoder develops on line 62 a frame-reference pulse. The decoder further detects the time differential between each pair of pulses. On properly recorded tapes, this time differential, with that between other pairs of pulses in the series, is used to reconstruct the elapsed time signal. The decoder further uses this signal and the frame-reference pulses to develop a frame count which, with the reproduced elapsed time signal, is developed on a bus 72 to identify the current tape location.

The principal active components of encoder 28 include a divide-by-thirty counter 100, two divide-by-sixty counters 102 and 104, a counter 106, a shift register 108, and a one-shot multivibrator 110. Counters 100, 102, 104 and 106 are configured to count the number of frame-reference pulses which have been developed on line 24 since the occurrence of a record initiate pulse developed on line 26, to develop a sum signal. The sum signal is indicative of the period of time which has elapsed since recording commenced, referred to as the elapsed record time.

More specifically, counter 100 is a divide-by-thirty counter having a clocking input connected to line 24, a reset input connected to line 26 and a carry output connected to a line 112.

When recording is commenced, counter 100 is reset by the record initiate pulse developed on line 26. Thereafter, by counting the frame-reference pulses developed on line 24 at a 30-Hertz rate, the counter is operative to develop pulses on line 112 at a 1-Hertz rate.

Divide-by-sixty seconds counter 102 has a clocking input connected to line 112, a reset input connected to line 26, a sum output connected to a bus 114, and a carry output connected to a line 116.

Following receipt of the resetting, record initiate pulse developed on line 26, counter 102 is operative to count the 1-Hertz pulses developed on line 112 to develop on bus 114 signals representing the seconds portion of the elapsed record time and on line 116 pulses at a one-per-minute rate.

In the preferred embodiment, the signals developed on bus 114 are configured as a pair of binary-coded decimal (BCD) digits, one representing the seconds/units and the other the seconds/tens of the elapsed record time signal.

Divide-by-sixty minutes counter 104, which is similar to seconds counter 102, has a clocking input, a reset input, a sum output and a carry output which are connected to line 116, line 26, a bus 118 and a line 120, respectively.

After being reset by the pulse developed on line 26, the minutes counter is operative to count the seconds carry pulses developed on line 116 and to develop on bus 118 a pair of BCD digits representing the units and tens portion of the minutes portion of the elapsed record time, and on line 120 pulses at a one-per-hour rate.

Hours counter 106 has a clocking input connected to line 120, a reset input connected to line 26 and a sum output connected to a bus 122.

After being reset by the pulse developed on line 26, hours counter 106 is operative to count the minutes carry pulses developed on line 120 and to develop signals on bus 122, also in BCD format, representing the hours portion of the elapsed record time.

A synchronization pattern signal generator 124 is connected by a bus 126 to shift register 108. The generator is operative to develop a unique bit pattern signal, or word signal, on the bus which is distinguishable from the BCD signals representing the elapsed record time signal developed by the counters. In the preferred embodiment, the synchronization word signal is comprised of six bits, the first five being at the high logic level, or ones, and the sixth a low logic level or zero. The word signal is distinguishable from the BCD elapsed record time, the signals of which in any combination may have no more than three successive bits which are at the high logic level.

The synchronization pattern generator 124 is most conveniently implemented by directly connecting the six lines of bus 126 to the appropriate high or low logic voltage levels.

Shift register 108 has a clocking input connected to line 24, a load input connected to line 112, 30 parallel inputs connected to the lines of buses 126, 114, 118 and 122, and a serial output connected to a line 128.

Each second, coincident with the 1-Hertz pulses developed on line 112, shift register 108 is operative to load the synchronizing word signal and the elapsed record time signal which are developed on buses 126, 114, 118 and 122. During the following second, coincident with each of the frame-reference pulses developed on line 24, a signal level representing one bit of the loaded signals is serially developed on line 128 for routing to multivibrator 110.

One-shot multivibrator 110 has a trigger input connected to line 24, a pulse width determining input connected to line 128 and an output connected to a line 130.

Responsive to each frame-reference pulse developed on line 24, the multivibrator develops an output pulse on line 130 having a leading edge which is coincident with the leading edge of the respective frame-reference pulse. The width of each output pulse (wide or narrow) is determined by the binary signal level developed on line 128.

These selectively wide or narrow output pulses are then amplified by a head driver 132 which develops amplified pulses on lines 30 suitable for driving head 32.

As illustrated, counters 100, 102, 104 and 106 are reset by the record initiate pulse developed on line 26 to measure the elapsed recording time therefrom. In an alternative embodiment, line 26 is connected to a load input of each counter. In addition, present inputs to the counters are driven by an initialization time signal, such as that developed by a bank of operator-adjustable thumb wheel switches, from which the decoder measures the elapsed record time. Alternatively, a time of day signal may be used to preset the counters.

The principal components of decoder 64 which demodulates the reproduced signal include a pair of Schmitt triggers 150 and 152, a one-shot multivibrator 154, and a pair of flip-flops 156 and 158. Schmitt trigger 150 has an input connected by a line 160 to the output of an amplifier 162 which has inputs connected by lines 70 to playback head 66. The Schmitt trigger 150 also has an output which is connected to line 62.

For convenience, it is assumed that the amplifier 162 is so connected to the head as to develop on line 160 a positive pulse coincident with the flux reversal associated with the leading edge of each recorded pulse and to develop on line 160 a negative pulse coincident with the flux reversal associated with the trailing edge of each recorded pulse.

Schmitt trigger 150 is configured so as to develop a frame-reference pulse on line 62 only in response to the positive pulses developed on line 160 which exceed a level which is sufficiently high to eliminate most noise pulses.

This arrangement of head 66, amplifier 162 and Schmitt trigger 150 is similar to that employed in many prior art video tape recorders for recovering the normal constant-width frame-reference pulses.

Schmitt trigger 152, which has an input connected to line 160, is configured to develop pulses on a line 164 in response to the negative pulses developed on line 160 which exceed the noise level.

Multivibrator 154 has a triggering input connected to line 62 for receiving the reproduced frame-reference pulses and generates a constant width sample-reference output pulse on an output line 166 in response to each pulses developed on line 62. The multivibrator is configured to generate sample-reference pulses having a width which is in between the two pulse widths that are generated by encoder 28 for recording onto the tape.

Flip-flop 156 has a clocking input connected to line 164, a data input connected to line 166 and generates an output on a line 168.

When clocked by each pulse generated by Schmitt trigger 152 in response to the trailing edge of each of the recorded pulses, flip-flop 156 samples the signal level generated by multivibrator 154 on line 166. The flip-flop thus develops, on line 168, a signal level indicative of the relative width of the recorded and sample-reference pulses, i.e., whether the recorded pulse was wide or narrow.

Flip-flop 158 has a clocking input connected to line 62, a data input connected to line 168 and an output connected to a line 170. Flip-flop 158 is operative to generate bit signals on line 170 having a logic level similar to those generated on line 168, but which have a constant width and which are delayed one clocking period, or frame period, from the recorded pulses.

The other portion of decoder 64 which converts this series of reproduced bit signals into a reproduced elapsed time signal representing the corresponding recorded elapsed time signal includes a shift register 172, synchronizing word signal detector 174 and four counters 176, 178, 180 and 182. Shift register 172 has a data input connected to line 170, a clock input connected to line 62 and 30 parallel outputs, the first six of which form a bus 184 and the others form three 8-line buses 186, 188 and 190.

The reproduced bit signals serially developed on line 170 are clocked into the shift register which serially generates similar, but delayed appropriately, output levels on each of the lines of buses 184, 186, 188 and 190.

Synchronization word signal detector 174 has inputs connected to bus 184 and generates an output on a line 192. The detector includes gates (not shown) for detecting the simultaneous presence of the bit signals representing the synchronizing word signal when they are generated on bus 184 and in response for developing a pulse on line 192.

Divide-by-thirty frame counter 176 has a clocking input connected to line 62, a reset input connected to line 192, five sum outputs connected to bus 72 and a carry output connected to a line 194. Divide-by-sixty seconds counter 178 has a clocking input connected to line 194, a load input connected to line 192, eight preset inputs connected to bus 186, eight sum outputs connected to bus 72, and a carry output connected to line 196.

Divide-by-sixty minutes counter 180 has a clocking input, a load input, eight preset inputs, eight sum outputs and a carry output connected to line 196, line 192, bus 188, bus 72 and a line 198, respectively. Hours counter 182 has a clocking input connected to line 198, a load input connected to line 192, eight preset inputs connected to bus 190 and eight sum outputs connected to bus 72.

Coincident with each synchronizing word signal detected pulse usually generated once per second on line 192, counter 176 is reset and counters 178, 180 and 182 are preset with the signals developed on buses 186, 188 and 190, respectively. During the following second, counters 178, 180 and 182 develop similar signal levels on bus 72 which represent the reproduced elapsed recorded time. During this second, frame counter 176 is operative to count the frame-reference pulses developed on line 62 to generate frame count signal on bus 72.

It is no doubt apparent that counters 178, 180 and 182 may be replaced by simple latches. The present configuration, however, provides a degree of noise immunity. For example, should the synchronizing word signal not be detected by synchronization detector 174, frame counter 176 will develop a carry bit on line 194 properly clocking counters 178, 180 and 182 to properly increment the elapsed recorded time signal developed on bus 72.

Operationally, when recording is commenced, a record initiate pulse is generated on line 26. This pulse resets (zeros) counters 100, 102, 104 and 106. Thereafter, the counters count each of the 30-Hertz frame-reference pulses generated on line 24 to develop signals on buses 114, 118 and 122 indicative of the elapsed record time.

Once each second counter 100 develops a carry pulse on line 112 causing shift register 108 to load the synchronization word signals developed by synchronization pattern generator 124 and the elapsed record time signals developed on buses 114, 118 and 122. During the following second, each of the 30 frame-reference pulses generated on line 24 cause shift register 108 to serially generate on line 128 signals levels corresponding to the individual bit levels of the loaded signals.

With additional reference to FIG. 2, the 30 frames which are generated each second are designated at 200 by the numbers 0 through 29.

The individual bit signals generated by shift register 108 are illustrated at 202 aligned with their corresponding frame number. The bits comprising the synchronization word signal are illustrated at 204 and 206. At 208, 210, 212, 214, 216 and 218 the bits representing the tens and units of the hours, the tens and units of the minutes, and the tens and units of the seconds are illustrated for an elapsed time of 12 hours, 28 minutes and 16 seconds.

These bit signals are coupled by line 128 to one-shot multivibrator 110 where they control the pulse width of the pulses generated by the multivibrator in response to each of the frame-reference pulses generated on line 24. These pulses are illustrated at 220 including a narrow pulse 222 generated in response to the low logic level signal depicted at 223. Also shown is a wide pulse at 224 corresponding to the high logic level shown at 226.

These pulses when amplified by driver 132 cause head 32 to appropriately magnetize a portion of a suitably disposed tape. During playback, this tape will cause head 66 and amplifier 162 to generate the pulses illustrated at 228. In response to the magnetization produced by the pulse illustrated at 222, amplifier 162 will generate two pulses: a pulse 230 corresponding to the leading edge of pulse 220 and a pulse 232 corresponding to the trailing edge thereof. In a similar fashion, the amplifier will generate a pair of pulses 234 and 236 corresponding to pulse 224. It will be noted that the time spacing between pulses 230 and 232 is relatively short corresponding to the width of pulse 220 as compared to the longer spacing between pulses 234 and 236.

The output of multivibrator 154, which is clocked by the positive pulses illustrated at 228, is shown at 238. The width of these pulses is in between the width of pulses 222 and 224.

Responsive to the negative-going pulses illustrated at 228, flip-flop 156 samples the level of the signal developed by multivibrator 154 to generate on line 168 the signal illustrated at 240.

In order to normalize the timing and period of the pulses comprising this signal, they are clocked into flip-flop 158 by the output of Schmitt trigger 150 which generates positive pulses corresponding to the positive portion of the signal illustrated at 228. The resultant signal, which is illustrated at 242, is seen to correspond to the signal at 202 but delayed one clocking period therefrom. The output of flip-flop 158 is clocked by the output of Schmitt trigger 150 into shift register 172.

When shift register 172 generates on bus 184 signal levels corresponding to the synchronizing word, synchronization detector 174 generates on line 192 a pulse such as those illustrated at 244 and 246. These pulses reset counter 176 and cause counters 178, 180 and 182 to load the signals generated on buses 186, 188 and 190 which are used to generate similar signals on bus 72 which correspond to the elapse record time. After being reset, counter 176 counts the frame-reference pulses generated on line 62 to develop on bus 72 a signal corresponding to the frame number.

Turning now to FIG. 3, an alternative embodiment of an elapsed time signal encoder in accordance with the present invention is generally designated by the number 300. The encoder receives a record initiate pulse generated on a line 302, which is similar to the one generated on line 26 of FIG. 1, frame-reference pulses generated on a line 304, which are similar to those generated on line 24, and develops record head driving signals between a pair of lines 306.

The principal active components of the encoder include four counters 308, 310, 312 and 314, a decoder 316, six gates 318, 320, 322, 324, 326 and 328, a 4-1 multiplexer 330, and a one-shot multivibrator 332. Divide-by-thirty counter 308 has a clocking input connected to a line 334, a reset input connected to line 302, a divide-by-two output connected to a line 336, a divide-by-four output connected to a line 338, a divide-by-eight output connected to a line 340, a divide-by-sixteen output connected to a line 342 and a divide-by-thirty-two output connected to a line 344. The counter includes gates (not shown) suitably connected to reset the counter following the occurrence of each thirtieth clocking pulse developed on line 334.

After having been reset by the record initiate pulse developed on line 302, counter 308 counts the pulses which are generated on line 334 coincident with the frame-reference pulses generated on line 304. The counter thus develops a binary sum signal at its outputs which ranges from 0 to 29 inclusive each second, and which is synchronized with the frames of the video signal being recorded. The most significant bit of the sum which is developed on line 344, clocks counter 310 at a one-second rate.

Counters 310, 312 and 314 are reset by the record initiate pulse generated on line 302 and thereafter count the pulses developed on line 344 to generate sum signals indicative of the elapsed record time, in a fashion similar to counters 102, 104 and 106 discussed in connection with FIG. 1. These sum signals are generated on six 4-line output buses, 346, 348, 350, 352, 354 and 356, representing the units and tens of the seconds, minutes and hours, respectively, of the elapsed record time signal.

Decoder 316 has three inputs connected to lines 340, 342 and 344, respectively, for receiving the three most significant bits of the sum signal developed by counter 308 and develops a unique enable signal output on one of eight lines which include lines 358, 360, 362, 364, 366, 368, 370 and 372. This enable output signal is developed on the various ones of the first seven output for four frames or clocking periods each, of counter 308, and on line 372 for two clocking periods. It is important to note that the output signal is developed on line 358 coincident with the first four counts of counter 308 and successively thereafter on lines 360, 362, 364, 366, 368, 370 and 372 with the successively increasing counts of the counter.

Units gate 318 has a control input connected to line 360, four data inputs connected to bus 346 and four data outputs connected to a four-line bus 374. The gate is responsive to the enable signal generated by decoder 316 on line 360 and operative to connect the signals generated on the lines of bus 346 to the corresponding lines of bus 374.

Gates 320, 322, 324, 326 and 328, which are similar to gate 318, have control inputs connected respectively to lines 362, 364, 366, 368 and 370 for in turn receiving an enable signal and in response for connecting, respectively, buses 348, 350, 352, 354 and 356 to bus 374.

Preferably, tri-state buffers are used for gates 318, 322, 324, 326 and 328, although electronic switches or other suitable gating devices may also be employed.

Encoder 300 also includes a synchronization pattern generator 376 and a gate 378 for generating a synchronizing word signal and for selectively coupling bus 374 or the synchronizing word signal to a bus 380. The synchronization pattern generator has a first input connected to line 358, a second input connected to line 372 and generates outputs on a four-line bus 382. Gate 378 has inputs connected to buses 374 and 382, and develops outputs on bus 380.

In the preferred embodiment, lines 358 and 372 are interconnected, and the four lines of bus 374 are connected to the respective ones of the four lines comprising bus 380. The generator and switch also include three diodes interconnecting the three lower order lines of the buses and the interconnected lines 358 and 372 to generate the appropriate signal levels comprising the synchronizing word signal on bus 380 when either lines 358 or 372 is enabled.

Alternatively, two gates, such as gates 318 and 320, may be used to connect a pattern generator, such as generator 124 of FIG. 1, to the connected buses 374 and 380.

Four-one multiplexer 330 has a first control input connected to line 336, a second control input connected to line 338, data inputs connected to bus 380 and an output terminal 384. Based on the binary number represented by the signals developed on lines 336 and 338, multiplexer 330 is operative to selectively connect, or multiplex, one of the four lines comprising bus 380 to terminal 384.

More specifically, each second, the four signals comprising the units and tens of the seconds, minutes and hours of the elapsed record time are connected to bus 380 for four clocking periods, or frames, each to be multiplexed by multiplexer 330 such that each signal is connected to terminal 384 for one period. In addition, each second the six signals comprising the synchronizing word are developed on bus 380, each will be similarly multiplexed for one period each to terminal 384 (the first two bits of the signal are connected for two periods at the end of each second, and the last four bits are connected for four periods at the beginning of each second). There thus appears at terminal 384 signals similar to those developed on line 128 of FIG. 1 (but shifted appropriately two frame numbers).

One-shot multivibrator 332 has a trigger input connected to line 304, a pulse width determining input terminal 386 which is connected by a first resistor 388 to a source of potential, and by a second resistor 390 to terminal 384, and an output connected to line 334. When triggered by a frame-reference pulse developed on line 304, multivibrator 332 generates a pulse on line 334 having a width dependent upon the current flowing into terminal 386. Since this current is in part controlled by the potential developed at terminal 384, the multivibrator will generate a wide or narrow pulse dependent upon the state of the signal developed at terminal 384.

The pulses developed on line 334 are amplified by a head driver 392 which generates signals between lines 306 suitable for driving a record head such as head 32 of FIG. 1.

The decoder corresponding to the encoder illustrated in FIG. 3 is not shown since, like the encoder/decoder illustrated in FIG. 1, it is symmetrical therewith. This decoder, in addition to two Schmitt triggers, one multivibrator and two flip-flops like those illustrated in FIG. 1, includes a synchronization word signal detector for serially monitoring the reproduced bit signals from the flip-flop and when the synchronizing word signal is detected, resetting a divide-by-thirty counter. The divide-by-thirty counter, which is clocked by the reproduced frame-reference pulses generated by the Schmitt trigger, develops a frame count signal which is decoded and used to drive gates which multiplex the bit signals into the appropriate locations in a seconds, a minutes and an hours counter to develop the reproduced elapsed record time signal.

Although in the preferred embodiment the elapsed record time signal is generated in BCD format, other formats such as straight binary may also be employed. Binary representation, being more efficient, leaves a number of bits available which may be used for recording other information.

Obviously, many other variations of the preferred embodiment are possible. For example, it is envisioned that a microprocessor may be used to replace the shift register, synchronization pattern generator, and counters of the encoder illustrated in FIG. 1. In this embodiment the record initiate pulse generated by the record circuit (line 26) is coupled to a first interrupt request input of the processor, and the frame-reference pulses (line 24) are coupled to a second interrupt request input of the processor in addition to triggering the multivibrator (110). The processor also has an output which is coupled to the pulse width determining input of the multivibrator (line 128).

Responsive to the record initiate pulse, the microprocessor is operative to reset, or zero, registers or memory locations reserved for maintaining a sum representing the elapsed record time. With the receipt of each frame-reference pulse, the processor increments this sum. During each frame the processor also generates a multivibrator-driving signal which serially corresponds to the bits of the sum.

This microprocessor may also replace the flip-flops, the shift register, the synchronization word signal detector and the counters of the decoder illustrated in FIG. 1. The output of Schmitt trigger 152 (line 164) is coupled to an interrupt request input of the processor, and the output of multivibrator 154 (line 166) is connected to a regular input of the processor.

Coincident with each pulse developed by Schmitt trigger 152, the microprocessor ascertains the level of the signal developed by the multivibrator to determine whether the recorded bit is wide or narrow. The processor also compares the stream of bits so developed with the pattern of the synchronizing word and when a match is found, a register or memory location for storing the frame count is reset.

The processor counts the pulses to ascertain the frame number and uses this number to determine the location in which to store each bit in order to reconstruct the elapsed record time signal on bus 72.

It is further envisioned that other equivalent methods of modulation may also be employed in addition to the above-described pulse width, or pulse duration, modulation. Since on playback, pulse width modulation appears similar to pulse position modulation (two pulses the spacing of which represents the encoded data), pulse position modulation is an obvious alternative.

Additionally, since the position of the second pulse must be in one of two relative locations (for a recorded wide or narrow pulse), it is thus only necessary for the circuitry to ascertain the presence or absence of the second pulse in one of the two positions.

For these reasons, it is contemplated that instead of recording a selectively wide or narrow pulse, a pair of pulses may be recorded, the selective presence or absence of the second one being indicative of a bit of the data.

This is conveniently implemented by replacing the multivibrator (110 illustrated in FIG. 1) with a pair of series connected one-shot multivibrators connected between the frame-reference pulse line (line 24) and a first input of an AND gate which drives a first input of an OR gate. The second input of the AND gate is connected to the shift register serial output (line 128), and the second input of the OR gate is connected to the frame-reference pulse line (line 24).

The first two multivibrators generate a pulse which is delayed with respect to each frame-reference pulse the appropriate period. The AND gate, based on each bit signal, selectively passes the delayed pulse, and the OR gate combines this pulse with the frame-reference pulse for recording onto the tape.

In the decoder, one Schmitt trigger (152), one flip-flop (156) and the multivibrator (154) are replaced by a pair of series-connected, one-shot multivibrators connected between the output of the remaining Schmitt trigger (Schmitt trigger 150, line 62) and the first intput of an AND gate, the second input of which is connected to the output of the Schmitt trigger (line 62). The output of the AND gate is connected to the set input of a set/reset flip-flop, the reset input of which is also connected to the Schmitt trigger output (line 62) and the output of which is connected to the serial input of the shift register (line 170).

The second multivibrator and the AND gate generate a time window, delayed appropriately from each reproduced pulse by the first multivibrator, during which the second of a pair of pulses may set the flip-flop.

Thus, in summary, the method of time signal encoding includes the steps of generating a series of frame-reference pulses from a video signal being recorded onto a tape. Preferably, the frame-reference pulses are counted generating an elapsed record time signal having a number of parallel generated bit signals. Next, a serial bit signal stream, which is time synchronized with the frame-reference pulses, is generated by multiplexing the bit signals of the elapsed record time signal. Finally, a modulated signal is developed for recording onto a video tape by modulating each pulse of the frame-reference pulses with a corresponding bit signal of the serial bit signal stream by a method such as pulse width modulation or pulse position modulation.

It is further contemplated that after having read the preceding disclosure, other alterations and modifications of the present invention will become apparent to those skilled in the art. It is therefore intended that the following claims be interpreted to cover all such alterations and modifications as fall within the true spirit and scope of the invention.

What is claimed is:

1. A video recorder for recording onto a tape a video signal and a signal indicative of the elapsed record time and for recovering from the tape a reproduced video signal and a reproduced elapsed record time signal suitable for indexing the tape comprising:
   first recording means for recording the video signal onto the tape and for generating a series of frame-reference pulses;
   timing means for generating an elapsed record time signal;
   first means for converting said elapsed record time signal into a series of bit signals which are in time synchronization with said frame-reference pulses;
   means for modulating each pulse of said frame-reference pulses with a corresponding one of said series of bit signals to generate a modulated signal;
   second recording means for recording said modulated signal onto a single track of said tape;
   first playback means responsive to the modulated signal recorded on said single track of tape and operative to develop a reproduced modulated signal;
   demodulating means responsive to said reproduced modulated signal and operative to generate a series of reproduced frame-reference pulses and a series of reproduced bit signals;
   second means for converting said reproduced bit signals into the reproduced elapsed record time signal; and
   second playback means for receiving said reproduced frame-reference pulses and based on the timing thereof for suitably accessing the video signal recorded on said tape so as to generate the reproduced video signal.

2. A video recorder as recited in claim 1 wherein said first converting means includes shift register means clocked by said frame-reference pulses, said shift register means having parallel input means for receiving said elapsed record time signal and serial output means for generating said bit signals.

3. A video recorder as recited in claim 1 wherein said timing means includes first counter means for developing a first sum of said frame-reference pulses and for generating said elapsed record time signal therefrom.

4. A video recorder as recited in claim 3 wherein said first counter means includes:
   second counter means for developing a second sum of said frame-reference pulses and for generating a series of carry pulses, whereby each pulse of said carry pulses corresponds to a predetermined number of said frame-reference pulses; and
   third counter means for developing a sum of said carry pulses and for generating said elapsed record time signal therefrom.

5. A video recorder as recited in claim 4 wherein said first converting means includes shift register means clocked by said frame-reference pulses, said shift register means having parallel input means for receiving said elapsed record time signal coincident with each pulse of said carry pulses, and serial output means for generating said bit signals.

6. A video recorder as recited in claim 5 further comprising a synchronization pattern generator coupled to said parallel input means, said synchronization pattern generator for developing a signal which is distinguishable from said elapsed record time signal.

7. A video recorder as recited in claim 4 wherein said third counter means has a plurality of third counter outputs on which are generated signals representing said sum of said carry pulses, and wherein said first converting means includes switching means responsive to said second sum of said frame-reference pulses and operative to serially access each output of said third counter outputs to generate said bit signals.

8. A video recorder as recited in claim 1 wherein said first converting means includes switching means for serially accessing individual binary components of said elapsed record time signal to generate said bit signals.

9. A video recorder as recited in claim 1 wherein said modulating means pulse width modulates each pulse of said frame-reference pulses with a corresponding one of said series of bit signals to generate said modulated signal.

10. A video recorder as recited in claim 9 wherein said modulating means includes multivibrator means having a triggering input means for receiving said frame-reference pulses and control input means for receiving said bit signals whereby said multivibrator means in response to each pulse of said frame-reference pulses generates a pulse of said modulated signals having a width determined by the corresponding one of said bit signals.

11. A video recorder as recited in claim 1 wherein said modulating means includes means responsive to said bit signals and operative to generate a first pulse of said modulating signal for each pulse of said frame-reference pulses and to selectively generate a second pulse of said modulating signal a predetermined time thereafter.

12. A video recorder as recited in claim 1 wherein said demodulating means includes:
- a first Schmitt trigger responsive to the level of said reproduced modulated signal and operative to generate said reproduced frame-reference pulses;
- a second Schmitt trigger responsive to the level of said reproduced modulated signal and operative to generate a series of control pulses;
- a multivibrator triggered by each pulse of said reproduced frame-reference pulses for generating a sample-reference signal comprised of a series of sample-reference pulses having a predetermined width; and
- a flip-flop responsive to each pulse of said series of control pulses and operative to sample the level of the sample-reference signal to generate said reproduced bit signals.

13. A video recorded as recited in claim 1 wherein said second converting means includes shift register means having serial input means for receiving said reproduced bit signals and parallel output means for developing said reproduced elapsed record time signal.

14. In a recorder system including means for recording a video signal onto a tape and for generating a series of frame-reference pulses, means for recording the frame-reference pulses onto the tape, means for reproducing the recorded frame-reference pulses, and means responsive to the reproduced frame-reference pulses for reproducing the recorded video tape, an improved frame-reference pulse recorder means comprising:
- means for generating a signal indicative of the elapsed record time;
- means for converting said elapsed time signal onto a series of bit signals which are in time synchronization with the frame-reference pulses;
- means for modulating each pulse of said frame-reference pulses with a corresponding one of said series of bit signals to generate a modulated signal; and
- means for recording said modulated signal onto a single track of the tape.

15. A method of recording a video signal and a signal indicative to the elapsed record time onto a video tape which comprises:
- developing a series of frame-reference pulses from the video signal;
- developing a signal indicative of the elapsed record time, said elapsed record time signal including a plurality of parallel generated bit signals;
- multiplexing the parallel generated bit signals at a rate in time synchronization with said frame-reference pulses to develop a serial series of bit signals;
- modulating each pulse of said frame-reference pulses with a corresponding bit signal of said serial series of bit signals to develop a modulated signal; and
- simultaneously recording said video signal and said modulated signal onto the tape, wherein said modulated signal is recorded onto a single track of the tape.

16. A method of recording as recited in claim 15 wherein said elapsed record time signal is developed by counting said frame-reference pulses.

* * * * *